Oct. 9, 1962 H. EISLER 3,058,019

ELECTRIC MOTOR WITH HIGH STARTING TORQUE

Filed April 7, 1958 3 Sheets-Sheet 1

Inventor:
Hans Eisler
By [signature]
Patent Agent

Oct. 9, 1962 H. EISLER 3,058,019
ELECTRIC MOTOR WITH HIGH STARTING TORQUE
Filed April 7, 1958 3 Sheets-Sheet 2
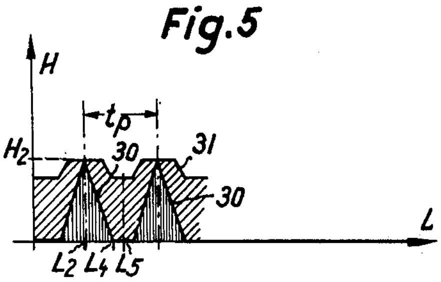
Fig.5
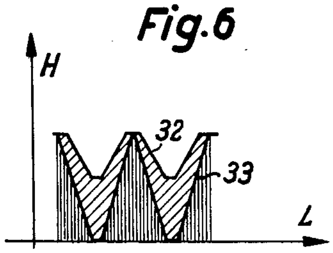
Fig.6
Fig.10
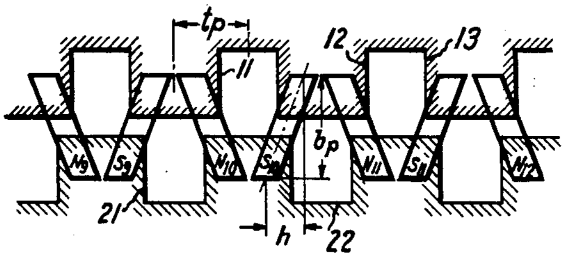
Fig.11
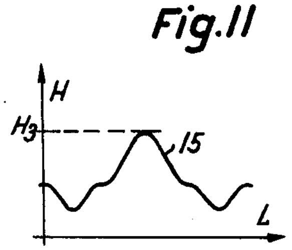
Fig.8
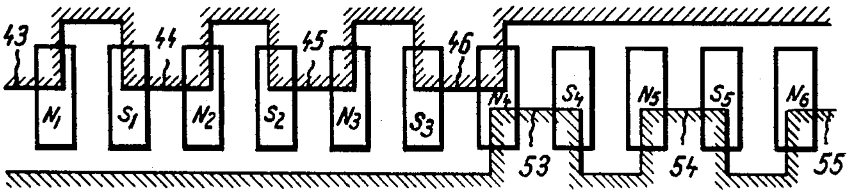
Fig.9
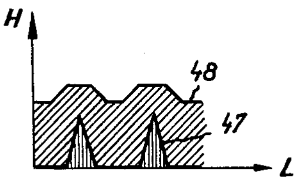
Fig.7
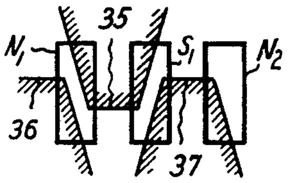
Inventor:
Hans Eisler
By [signature]
Patent Agent Oct. 9, 1962 H. EISLER 3,058,019

ELECTRIC MOTOR WITH HIGH STARTING TORQUE

Filed April 7, 1958 3 Sheets-Sheet 3

Inventor:

Hans Eisler

By Eric D. Frankel
Patent Agent 3,058,019
ELECTRIC MOTOR WITH HIGH STARTING TORQUE Hans Eisler, Berlin-Wilmersdorf, Germany, assignor to Licentia Patent-Verwaltungs-G.m.b.H., Hamburg, Germany Filed Apr. 7, 1958, Ser. No. 726,692
Claims priority, application Germany Apr. 8, 1957
22 Claims. (Cl. 310—164)

The present invention relates to electric motors and, more particularly, to means for ensuring good starting torque in electric motors.

Starting has always been a problem with single phase alternating current electric motors. To overcome this problem, these motors have usually been provided with two windings and electrical means for energizing the two windings in quadrature, short-circuited windings, or other such special devices. Yet, in spite of these special provisions, the starting torque was often poor. Since variations in material and construction also produce variations in the torque, such non-uniformities often produced added difficulties in starting.

It is, therefore, an object of the present invention to provide new and improved electric motors with positive starting torques.

It is another object of the invention to provide a new and improved alternating current motor having improved starting characteristics.

It has been found that electric motors having permanent magnet rotors tend to stop, when de-energized, in a particular rotary position that is unique to the type of motor. The designs of the armature and the rotor determine the position of rest of the rotor, and the rest position of the rotor often determines the starting torque of the motor. If the rotor has stopped at an angular position which is in line with the stator poles, there may be no torque generated by the subsequent energization of the stator. It is, therefore, a still further object of the present invention to provide an electric motor having a predetermined and definite rotor rest position.

It is another object of the present invention to provide a new and improved electric motor having a rotor with reduced leakage flux.

It is a further object of the invention to provide an electric motor having an improved rotor which provides high starting torque.

Still another object of this invention is to provide a new and improved rotor structure having permanent magnets formed about the circumference of a cylinder to generate flux fields of high densities.

It is a further object of this invention to provide a new and improved permanent magnet rotor having a plurality of poles, which poles are definitely and separately defined. It has been found that the careful demarcation of individual poles of permanent magnet rotors aids in the precision with which the rotor rest position can be predicted. By more definitely controlling the rest position of the rotor, greater starting torque is assured. Therefore, the careful delineation of the rotor poles aids in assuring strong starting torque.

In carrying out this invention, an electric motor is provided having a rotor with a plurality of permanent magnet poles impressed about the circumference of a cylinder of a high coercive material. Surrounding the rotor is a stator having two rows of salient poles arranged on either side of a central air space ringing the rotor. The length of each stator pole must bear a predetermined relation to the space between poles and to the size of the rotor poles. The sizes are measured along the circumference of the stator. If the rotor and stator pole relationships are properly selected, the starting torque may be forecast with reasonable accuracy.

Several types of rotor structures may be used with the stator structure mentioned. One rotor comprises a cylindrical body of high coercive material mounted for rotation. The body is permanently axially magnetized to provide a plurality of poles about the circumference of the cylinder. On each end of the cylinder, toothed disks of soft iron are positioned to serve as pole faces. The teeth of the disks may extend, like cogs of a gear, only to the periphery of the cylinder, or they extend past the surface of the cylinder and be bent at 90° to parallel the rotor axis. In the latter condition, the rotor has the appearance of a cage, with the pole faces forming the bars. The pole pieces of the two disks alternate, all of the pole pieces from one disk being of one polarity and all of the pole pieces of the other disks being of the opposite polarity. When the pole pieces are bent to form legs which are parallel to the rotor axis, they become restricted in cross-sectional area at the bend and are likely to saturate there at the higher flux densities required for good motor operation. To obviate this, the pole pieces are extended axially until they are beyond the end of the rotor. This tends to reduce the leakage flux and the saturation at the knee of the pole piece. In either modification described, the toothed disks help to more clearly demark the boundaries of the rotor poles and, in this manner, help to more definitely determine the rest position of the rotor and to ensure adequate starting torque.

Still further objects and the entire scope of applicability of the present invention will become apparent from the detailed description given hereinafter; it should be understood, however, that the detailed description and specific examples, while indicating preferred embodiments of the invention, are given by way of illustration only, since various changes and modifications within the spirit and scope of the invention will become apparent to those skilled in the art from this detailed description.

In the drawings:

FIGURES 5 and 6 are curves, illustrating the distribution of rotor flux linking the stator with respect to rotational positions of the rotor for the magnetic circuits shown in FIGURES 3 and 4;

FIGURE 7 is a schematic development of a portion of a modified stator structure with overlayed rotor poles according to the principles of this invention;

FIGURE 8 is a schematic development of a modified stator structure with overlayed rotor poles similar to FIGURE 1;

FIGURE 9 is a curve, illustrating the relationship of the rotor flux linking the stator in the structure of FIGURE 8;

FIGURE 10 is a schematic development of a portion of the stator structure of FIGURE 1, overlayed with modified rotor poles;

FIGURE 11 is a curve, illustrating the variations in rotor flux linking the stator with respect to rotational positions of the rotor in the structure of FIGURE 10;

Figure 1:
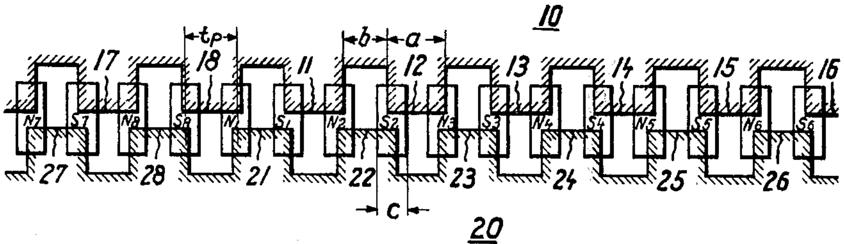
FIGURE 1 is a development, in schematic form, of a motor stator overlayed with the rotor poles in accordance with the principles of this invention.

Referring now in more detail to the drawings, and particularly to FIGURE 1, the reference character 10 designates a row of salient stator poles 11, 12, 13, 14, 15, 16, 17 and 18 on one side of a motor stator. A second row 20 of salient poles 21, 22, 23, 24, 25, 26, 27 and 28 are arranged on the other side of the stator from the row 10 and in staggered relation thereto. The poles of the row 10 are so arranged as to face the space between poles of the second row 20. Shown in one possible rotational position with respect to the stator poles are the permanent magnet poles $N_1$, $S_1$, $N_2$, $S_2$, $N_3$, $S_3$, $N_4$, $S_4$, $N_5$, $S_5$, $N_6$, $S_6$, $N_7$, $S_7$ and $N_8$, $S_8$, of the rotor. The rotor poles are illustrated as blocks to show their positional relationship to the stator only. The respective "N" and "S" designations of the rotor blocks are to indicate the north and south poles of the rotor. It is not important for this discussion which particular pole is a north pole and which is a south pole, as long as the relative polar values are kept in mind. It should be remembered during this discussion that the rotor poles alternate in polarity and that a stator pole of one side is opposite a space between poles on the other side. In FIGURE 1, the embodiment shown has a rotor with eight pairs of poles and a stator with eight pairs of poles, but the principles of this invention do not require the number of poles of the rotor to equal that of the stator. In the stator structure as shown, when energized, the poles of one row are always of the same polarity and the poles of the other row are of the opposite polarity.

For proper operation of this invention, it has been found that the stator pole width *a*, measured along the circumference of the stator, should be greater than the pole pitch of the rotor, said pole pitch being 180 electrical degrees, or the distance from the center of one pole to the center of the adjacent, dissimilar pole. This means that the stator poles are each wider than the space between poles *b*. As shown in FIGURE 1, the rotor poles are so positioned that each rotor pole has the greatest possible area adjacent the stator poles. In this position, the permeability of the magnetic circuits for the rotor flux is at a maximum and the rotor flux linking the stator is also at a maximum.

Figure 2:
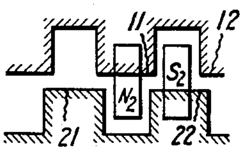
FIGURE 2 is a schematic development of the stator of FIGURE 1, with the overlayed rotor poles in a different rotational position.

The rest position of the rotor illustrated in FIGURE 1 is a stable position, since any variation from that position results in forces tending to return the rotor. FIGURE 2, however, illustrates an unstable rest position. Any deviation from the position of FIGURE 2 results in forces tending to drive the rotor to the position of FIGURE 1. Thus, although the rotor will remain in either position if it should happen to come to rest therein, only the position of FIGURE 1 is stable.

Figure 3:
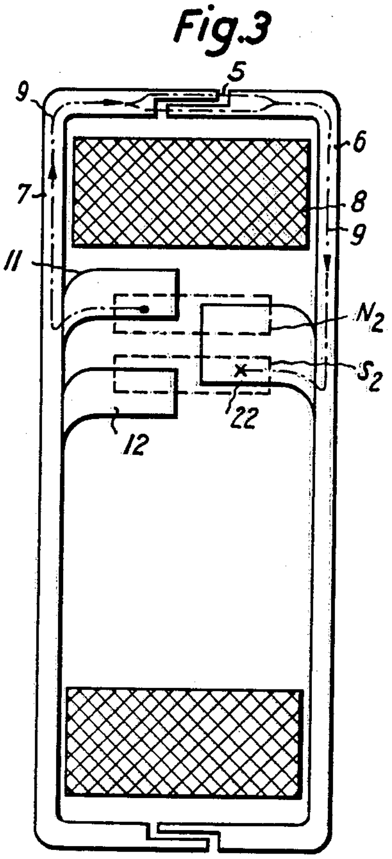
FIGURE 3 is a diagrammatic illustration, partially in section, of a portion of the stator of FIGURE 1, showing the relative location of appropriate rotor poles.
Figure 4:
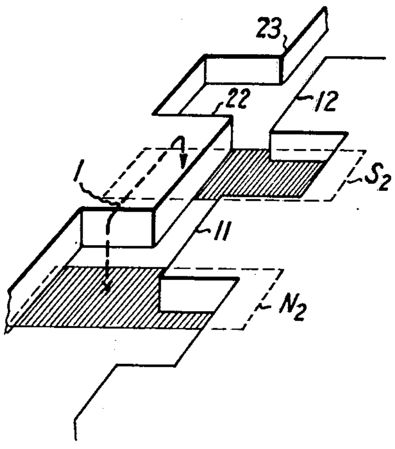
FIGURE 4 is a perspective view of a portion of the stator of FIGURE 1, showing the location of selected rotor poles.

The forces on the rotor, when the stator is not energized, can better be understood from FIGURES 3 and 4, which illustrate the rotor poles $N_2$ and $S_2$ and the salient stator poles 11, 12, 22 and 23 of the structure of FIGURE 1. With the relative position of the rotor and the stator shown in FIGURES 3 and 4, there are two paths for the rotor flux to take through the stator. Considering first FIGURE 4, the dashed line 1 represents the flux emanating from rotor pole $N_2$, passing through the air gap between the rotor pole $N_2$ and the stator pole 22, through the stator pole 22, and then across the air gap between the stator pole 22 and the rotor pole $S_2$ into the rotor. A second path is designated 9 in FIGURE 3. In this path, the flux emanates from the rotor pole $N_2$, crosses the air gap between the pole $N_2$ and the stator pole 11, passes through the left-hand portion of the stator body 7, across a small air gap 5 between the left portion 7 of the stator and the right portion 6 of the stator, into the stator pole 22, across the air gap between the stator pole 22 and the rotor pole $S_2$, and into the rotor at $S_2$. The stator coils are designated 8 in FIGURE 4, but for this discussion, they are not energized and will, therefore, be ignored. As is well known, a magnetic body capable of motion and placed in a magnetic field will always assume the position in that field at which the permeability of the magnetic paths is the greatest. In the position of greatest permeability, the reluctance is at a minimum and the magnetic flux linking the magnetic body with the source of the flux will be the greatest. This is illustrated by the curves in FIGURES 5 and 6 with respect to the rotor and stator of FIGURE 1.

In FIGURE 5, the curve 30 represents the magnitudes of rotor flux which links the stator with respect to the rotor position. Two positions of maximum flux linkage between the rotor and the stator can be seen. These two positions of maximum flux linkage are separated by a distance $t_p$, which represents the pole pitch of the rotor poles. Thus, the position of the rotor in FIGURE 1 represents the position of maximum flux linkage with the stator, and a second position of maximum flux linkage occurs when the rotor moves through a distance $t_p$, either to the right or to the left, since this arrangement is symmetrical, equal to the pole pitch. In other words, if the rotor moved to an extent such that the present positions of the north poles were replaced by south poles, a second maximum flux linkage would result. The curve 31 of FIGURE 5 represents the same general situation when the flux path 9 of FIGURE 3 is taken into consideration. In FIGURE 5, the position represented by the character $L_2$ designates the rotor position of FIGURE 1 and that designated $L_5$ represents the rotor position of FIGURE 2. In the position of FIGURE 2, the forces on the rotor from two adjacent stator poles are equal and opposite, but a slight variation in that position unbalances these forces and the rotor assumes the position of maximum flux linkage. Thus, in FIGURE 2, the forces on rotor pole $N_2$, by reason of its magnetic flux, result in equal attractions from the stator poles 21 and 22 and virtually no attraction from pole 11. However, when $N_2$ is moved either to the left or to the right, the air gaps between $N_2$ and the poles 21 and 22 become unequal and the forces on the rotor are unbalanced. In the position shown in FIGURE 1, however, the rotor poles are covered, in the aggregate, by the maximum possible area of the stator poles, and any movement of the rotor in any direction would merely serve to increase the air gaps and decrease the flux linkage. The rotor is immediately pulled back into the illustrated position.

It has been found that the width *a* of the stator poles should be greater than the space between poles *b*, for best results. A more representative figure for the stator pole width would be $1.13t_p$, where $t_p$ is the pole pitch of the rotor, as shown in FIGURE 1. Similarly, it has been found that a suitable width *c* for the rotor pole would be 0.2 of the stator pole pitch, or $0.4t_p$. A coupling factor C can be described as the ratio of the stator pole width *a* to the rotor pole width *c*, and gives an indication of the effectiveness with which the rotor rest position is determined. This can be represented $$C=\frac{a}{c}=\frac{1.13t_p}{0.4t_p}=2.83$$

The curves of FIGURE 5 have been prepared for a motor in which the coupling factor is 2.83. Motors may be constructed with pole structures of other sizes than that discussed. For example, the stator pole width may be 0.67 of the stator pole pitch or $1.34t_p$, and with the rotor poles equal to $0.4t_p$, $C=3.35$.

FIGURE 6 illustrates the variation in rotor flux linkage with the stator with respect to rotor positions for a coupling factor $C=3.33$. For proper operation of this invention, it is preferable that the values of the stator width lie between 0.55 and 0.75 of the pole pitch, or between $1.10t_p$ and $1.50t_p$. By comparing FIGURES 5 and 6, it can be seen how the linkage between the rotor and the stator improves with an increase in the coupling factor C. This improvement is primarily a clearer demarcation of the maximum linkage position, resulting in a more positive action in causing the rotor to assume the desired rest position.

Using this fact, a motor can be designed so that its rest position is assured. To then develop a strong starting torque, the stator should be so designed that the flux created by the newly energized stator winding would be displaced from the rotor rest position by an amount sufficient to forcibly attract the rotor to a new position. Referring again to FIGURE 1, which shows the rotor in its rest position, if the stator were energized so that the lower group (group 20) of poles became north poles on the first-half cycle of stator energization, and the upper group (group 10) became south poles, the rotor would be urged strongly to the left. Consider the rotor poles $N_1$ and $S_1$; stator pole 21 becomes a north pole and repels $N_1$ while, at the same time, attracting to its center $S_1$. Simultaneously, stator poles 11 and 17 become south poles, pole 11 repelling $S_1$ and pole 17 attracting pole $N_1$. This action occurs with respect to all of the rotor and stator poles, resulting in a strong force urging the rotor to the left, as shown. Since, at the moment the stator is energized, the rotor poles are so positioned that the center of the adjacent stator pole is midway between two rotor poles, the initial force is at a maximum. A strong starting torque is assured with the arrangement of parts as shown in FIGURE 1.

If, however, the rest position of the rotor were as shown in FIGURE 2, and the initial energization of the stator was as outlined above, then $N_2$ would be maintained in equilibrium between stator poles 21 and 22, both of which repel $N_2$, but in opposite directions, and $S_2$ would be held in equilibrium between poles 11 and 12 in the same manner. This is true of all of the rotor poles, and with the rotor in the rest position shown in FIGURE 2, little or no starting torque is generated.

Although the stator poles shown in FIGURES 1 to 4 are rectangular in shape and are arranged in staggered relation so that the center of one pole face is opposite the center of the space between poles of the other row, the invention is not limited to this general construction. Other forms of stators within this invention may comprise rectangular poles either directly opposite each other or non-rectangular poles either opposite each other or in staggered arrangement. The last form is illustrated in FIGURE 7, which shows stator poles 35, 36 and 37 as tapered cogs, having their widest portions adjacent the stator body and becoming narrower as they project into the space between poles. In FIGURE 7, the rotor poles $N_1$, $S_1$ and $N_2$ are of the same form as the rotor poles of FIGURE 1. Even though the widths of the stator poles of FIGURE 7 vary along their length, they are so designed that the average width of each pole is greater than the pole pitch. By the same token, even though the shape of the stator poles may be different from those described earlier, the rotor poles should bear the same general relationship to them. It is desirable to maintain the coupling factor about the same as indicated above.

In FIGURE 8, there is illustrated a further embodiment of the stator structure. Stator poles 43, 44 and 45 are shown on one side of the stator structure and poles 53, 54 and 55 are shown on the other side of the stator. In contrast to the earlier described stator structures, the poles 43 and 53, poles 44 and 54, and poles 45 and 55 are not opposite each other at all, but are displaced by about 180° about the circumference of the stator. Thus, all of the poles on one side of the stator are grouped together adjacent each other over about 180° of the stator, and the poles on the other side of the stator are grouped together adjacent each other over the remaining 180° of the stator circumference. As shown, one edge of pole 46 is adjacent one edge of pole 53 on the other side of the stator. The stator structure of FIGURE 8 results in permeabality and flux linkage patterns, as shown in FIGURE 9. As can be seen, the linkage pattern for the structure of FIGURE 8 is similar to that of FIGURE 1.

The rotor illustrated in FIGURES 1 to 4 is a cylindrical body of permanent magnet material having discrete permanent magnet poles impressed thereon radially. Although the rotor poles are illustrated as being rectangular, this shape is not necessary to the invention. A modification in the structure of the rotor is shown in FIGURE 10, wherein the rotor poles $N_9$, $S_9$, $N_{10}$, $S_{10}$, $N_{11}$, $S_{11}$ and $N_{12}$ appear as parallelograms which are not parallel to each other. The rotor poles are so arranged that adjacent poles are closer at one end than at the other, and that end changes from pair to pair. The short sides of each pole are parallel to the ends of the rotor cylinder and to the stator sides, and the sides of the poles are displaced from a position perpendicular to the ends to one which forms angles with the ends. The poles are so disposed that they form angles of approximately 60° with each other, but the vertex of the angles varies from one side to the other with each pair of poles. Thus, the vertex of the angle formed by the poles $N_9$ and $S_9$ is at the bottom of the figure, whereas the vertex of the angle formed by poles $S_9$ and $N_{10}$ is at the top of the figure.

The rotor flux linkage varies with the rotor position as shown in FIGURE 11, from which it can be seen that the points of maximum flux are more clearly defined than in the structures of FIGURES 1, 7 and 8. The curve 15 is of the same nature as the curve 31 of FIGURE 5, but does not have the flat portions over which the flux linkage remains substantially constant, as does the curve 31. The more sharply defined points of maximum flux linkage result in a rotor which has a more definite rest position and the resulting assurance of large and effective starting torque. The offset of the rotor poles is the ratio of the distance $h$ along the circumference of the rotor from the center of one pole at one end to the center of the same pole at the other end to $t_p$, which is the rotor pole pitch. Good results are achieved in determining the rest position of the rotor with definiteness when $h=0.4t_p$ to $0.6t_p$. This results in an angular relation of the pole sides with their ends of about 60°.

Figures 12, 13, 14, 15, 16, 17, 18:
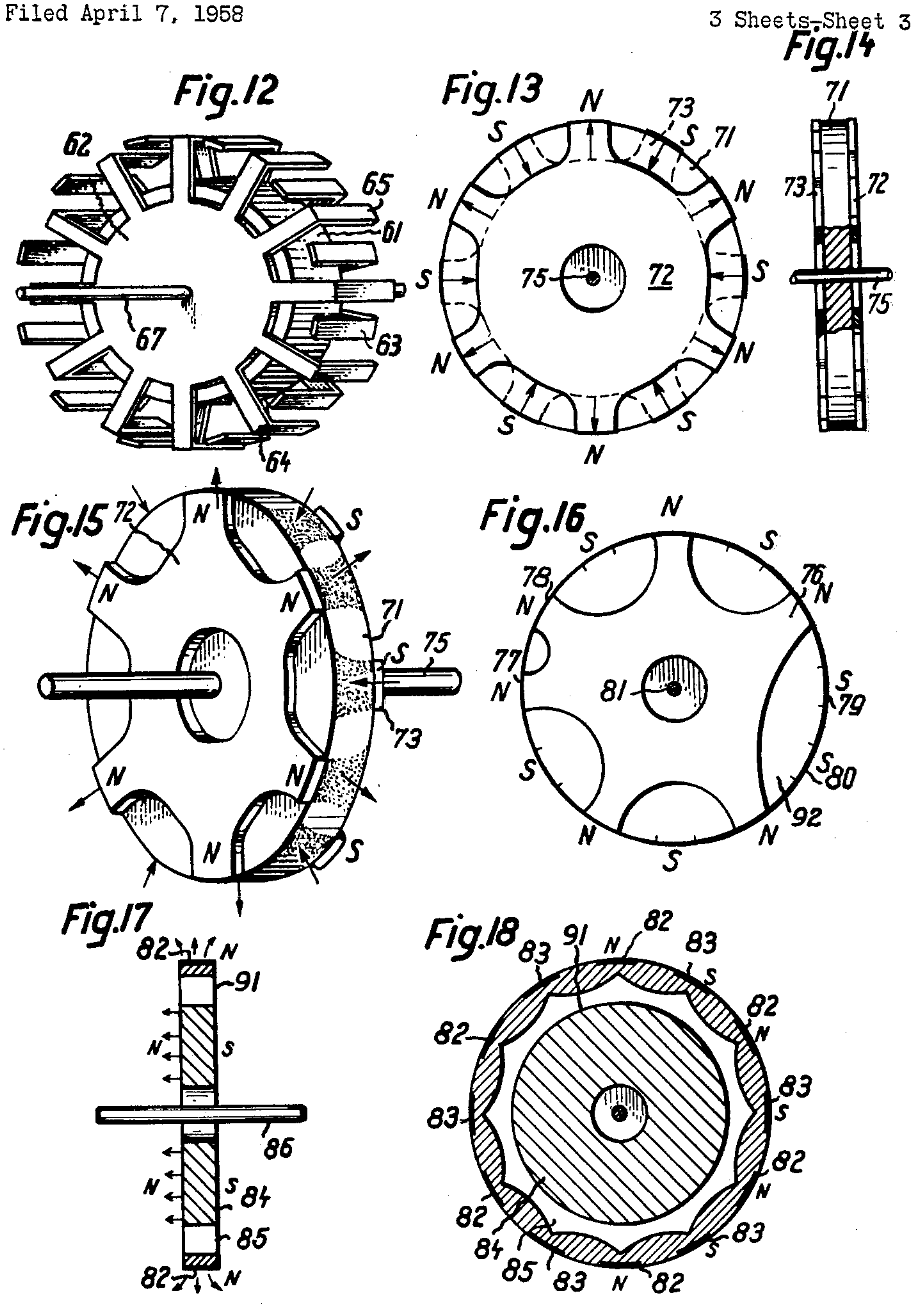
FIGURE 12 is a perspective illustration of a rotor according to the principles of this invention.
FIGURE 13 is an elevational view of a modified rotor according to this invention.
FIGURE 14 is an end view, partially in section, of the rotor of FIGURE 13.
FIGURE 15 is a perspective view of the rotor of FIGURE 13.
FIGURE 16 is an elevational view of a modified rotor according to this invention.
FIGURE 17 is an end sectional view of another modified rotor according to this invention.
FIGURE 18 is an elevational sectional view of the rotor of FIGURE 17.

Another rotor structure which aids in achieving the basic function of this invention, i.e., a reliable and strong starting torque in a single phase motor, is illustrated in FIGURE 12. The rotor is formed of a cylindrical body 61 of a material having a high coercive force with end disks 62 attached to each end thereof. The end disks 62 are preferably formed of soft iron or other such magnetic material and have salient pole portions extending radially therefrom. A shaft 67 extends from each side of the body 61 for rotatably mounting the rotor.

The permanent magnet material of the cylinder 61 is magnetized in such a manner as to define a north pole on one end of the cylinder and a south pole on the other end. Each of the salient poles of one of the disks 62 then becomes a north pole and each of the salient poles of the other disk 62 becomes a south pole. In this manner, a plurality of permanent magnets are defined about the circumference of the rotor, each permanent magnet having a north pole adjacent a south pole. The individual poles of the disks 62 extend beyond the surface of the cylinder 61 and are bent over at right angles to form legs 63 and 65 which are parallel to the axis of the cylinder, causing the rotor to look like a cage with the legs 63 and 65 forming the bars thereof. Reference numeral 64 designates the location of the bends of the legs 65. The legs 63 of one of the disks 62 are spatially alternated with the legs 65 of the other disk. Since the legs 63 and 65 are separated from the body of the cylinder 61, each clearly and definitely defines an individual pole.

When the poles are bent to form the legs 63 and 65, the cross-sectional area of the pole becomes restricted at the bend, and at high flux densities, the poles have a tendency to saturate at the knees. By extending the legs 63 and 65 axially beyond the ends of the cylinder 61, this tendency to saturate is reduced. Some of the flux which, otherwise, would pass through the knee of the pole couples with the extended leg from the disk portion of the pole and is deflected before it gets to the knee. In this manner, the flux density at the knee is decreased without loss of effective flux.

Another rotor structure, suitable for this invention, is illustrated in FIGURES 13, 14 and 15. A cylindrical body 71 of material having a high coercive force has attached to the ends thereof pole disks 72 and 73, said disks being formed of soft iron or other suitable pole material. Each disk has a plurality of teeth formed in the edges thereof and extending radially outwardly to the surface of the cylinder 71. The cylinder 71 is magnetized radially with the polarity of sequential poles on the circumference of the cylinder alternating. In this manner, a north pole lies between a south pole as exposed on the cylindrical surface. The disks 72 and 73 each have as many teeth as there are exposed poles of each polarity. This amounts to one-half the number of magnets impressed on the core 71. All of the teeth of each disk are of the same polarity, the disk 72 having its teeth arranged adjacent the south poles and disk 73 having its teeth adjacent the north poles. Ordinarily, the magnetic flux from one pole on the cylinder surface would tend to leak over into the adjacent poles, but the addition of the soft iron pole pieces 72 and 73 serves to more clearly define the poles by concentrating the flux in a radial direction along the side of the core 71 and at the surface. The clear definition of the poles on the surface of the rotor assures that the rest position will be more clearly determined.

The arrangement illustrated in FIGURES 13 to 15 is not limited to rotors in which the rotor poles are symmetrically distributed about the circumference of the rotor. In FIGURES 13 to 15, each north pole lies between two adjacent south poles and each south pole is between two north poles. A similar rotor, having another pole arrangement, is illustrated in FIGURE 16, in which the permanent magnetic material is formed into a cylinder 92 having soft iron or other suitable pole members 76 mounted on the ends. A shaft 81 extends from either side of the cylinder 92 to rotatably support the rotor. Impressed on the permanent magnetic material of the cylinder 92 are radial magnets having exposed poles spaced about the surface of the cylinder. Although the poles are uniformly spaced, they do not always alternate. Thus, two north poles 77 and 78 are adjacent each other and two south poles 79 and 80 are adjacent each other. Each disk 76 must have a single polarity for all of its teeth, therefore, the disks 76 must be shaped with an arrangement of teeth which corresponds to the arrangement of polarities impressed on the cylinder 92. As in the structures described above, the disks 76 serve to more clearly define the limits of the individual poles by concentrating the magnetic flux radially along the body 92 and at the surface of the cylinder. In this manner, even when the arrangement of magnetic poles about the rotor is not symmetrical, the addition of pole pieces, such as 76 serves to improve the certainty with which a rotor assumes a desired rest position. The positions at which the linkage of the rotor flux with the stator are at maximum are more clearly defined in the rotors of FIGURES 13 to 16, and these rotors may be produced more cheaply and more easily than the other forms of rotors.

The magnetization of the rotor may be improved by impressing thereon an axial magnetization in addition to the radial magnetization of FIGURES 13 to 16. This type of rotor is illustrated in FIGURES 17 and 18. No end disks are shown in FIGURES 17 and 18 to avoid confusion and to more clearly show the pertinent parts of the rotor. A cylindrical body of permanent magnet material 91 is rotatably mounted on a shaft 86 and is radially magnetized to form a plurality of permanent magnets having exposed poles 82 and 83 on the cylindrical surface. The permanent magnets are so arranged that the exposed poles alternate in polarity, a north pole lying between two south poles. In addition to the radial magnetization, the body 91 has an axial magnetization also impressed thereon through a portion of the body 84 which lies between the surface and the center of the cylinder. A south pole is formed thereby on one end of the cylinder and a north pole at the other end. Between the surface of the cylinder and the axially magnetized portion 84 is an unmagnetized portion 85. End disks (not shown) may also be placed on each end of the cylinder 91, as described above in connection with FIGURES 13 to 16. The axial magnetization superimposed upon the radial magnetization serves to more definitely delineate the poles by concentrating the flux, thus, producing a rotor whose rest position can be more definitely determined.

A new and improved single-phase electric motor having a high and positive starting torque has been described. The new motor is so constructed that its rotor will always assume a desired rotational position when the stator windings are denergized, ensuring that subsequent energization results in strong starting torque. Since other modifications of this invention will occur to those skilled in the art without the exercise of invention, this invention is to be limited only by the scope of the appended claims.

I claim:

1. A single-phase electric motor comprising, in combination: a stator having a first row of salient poles and a second row of salient poles, said first row being positioned about the circumference of the motor opposite said second row and slightly spaced axially therefrom, and a coil connectible to an A.C. source for energizing said poles; and a permanent magnet rotor mounted for rotation in operative relation to said stator, said rotor having equally spaced poles derived from its permanent magnet, the width of said stator poles being greater than the pole pitch of said rotor.

2. The motor defined in claim 1, wherein the salient poles of said first row are each positioned opposite a space between poles of said second row.

3. The motor defined in claim 1, wherein said stator poles are symmetrical about a plane through the axis of rotation of said rotor.

4. The motor defined in claim 1, wherein said rotor comprises a cylindrical body of permanent magnet material having rectangular magnetic poles spaced about its cylindrical surface.

5. The motor defined in claim 1, wherein said rotor comprises a cylinder of permanent magnetic material magnetized in a radial direction to produce permanent magnet rotor poles.

6. The motor defined in claim 1, further including means for supporting said first row of stator poles and said second row of stator poles, and means of diamagnetic material interposed in the flux path between said first and second rows.

7. The motor defined in claim 6, wherein said supporting means comprises a first supporting means for said first row and a second supporting means for said second row, and wherein said diamagnetic material interposed in said flux path comprises an air gap.

8. The motor defined in claim 7, wherein said air gap comprises an electrically conductive non-magnetic filling.

9. An electric motor comprising a stator having two rows of salient poles, said two rows of salient poles being oppositely disposed about the circumference of said stator and a rotor comprising a plurality of permanent magnets with pole faces facing said stator pole faces, the adjacent sides of said rotor poles being inclined towards each other, the pole faces of said stator poles being greater than the pole pitch of said rotor.

10. The motor defined in claim 9, wherein the angle of inclination of the adjacent rotor pole sides is approximately 60°.

11. The motor defined in claim 1, wherein the width of said stator poles and the space between poles of the stator are in a ratio of 1.1:1 to 1.5:1, said widths being measured along the stator circumference.

12. The motor defined in claim 1, further including means for supporting said first and second rows, said first row comprising salient poles through only a first 180° of said stator and said second row comprising salient poles through only a second 180° of said stator, said first and second 180° of said stator being non-identical.

13. An electric motor comprising, in combination: a stator having a first row of salient poles and a second row of salient poles, said first and second rows being oppositely disposed along the circumference of said stator; and a rotor rotatably mounted within said stator, said rotor comprising a body of permanent magnet material axially magnetized and end plates for said rotor, said end plates being formed with teeth along their edges and being operatively connected to the ends of said rotor, said teeth being bent to form legs which constitute rotor poles that are parallel to the rotor axis, and said legs extending axially beyond the end of said rotor which is opposite to that of the base of said teeth, the width of said stator poles being greater than the pole pitch of said rotor.

14. An electric motor comprising, in combination: a stator having two rows of opposed stator salient poles; a permanent magnet rotor mounted for rotation within said stator and comprising a cylindrical body of permanent magnet material having flat end portions, said body having a plurality of permanent magnets with exposed poles along the cylindrical surface of said body radially impressed thereon, and toothed disks of soft magnetic material fastened to each of said flat ends, the teeth of each disk being aligned with the same polarity magnetic poles of said body and terminating flush with the circumference of said body, the width of said stator poles being greater than the pole pitch of said rotor.

15. The motor defined in claim 14, wherein said rotor body is also axially magnetized to form magnetic poles on the ends of said body.

16. The motor defined in claim 15, wherein the portion of said body axially magnetized forms an annulus in cross section on a plane perpendicular to the axis of rotation of said rotor.

17. An electric motor comprising a stator having salient stator poles, said stator salient poles being arranged in two opposite rows, means for supporting said stator poles, said stator poles being tapered with their greater width adjacent said support and their narrower width opposite the poles of the opposite row, and a permanent magnet rotor supported for rotation within said stator structure and having equally spaced poles, the average width of said stator poles, measured along the circumference of said stator, being greater than the pole pitch of said rotor.

18. The motor defined in claim 14, wherein said exposed poles are uniformly distributed about the circumference of said body, each pole of one polarity lying between two poles of opposite polarity.

19. The motor defined in claim 14, wherein said exposed poles are uniformly spaced about the circumference of said body, some poles being adjacent poles of the same polarity.

20. A single-phase electric motor comprising, in combination: a stator having salient poles, said stator poles being, in their circumferential dimension wider than the pole pitch of said stator; a permanent magnet rotor mounted for rotation in operative relation to said stator and having poles which, in their circumferential dimensions, are smaller than the pole pitch of said stator, the relative position of said rotor to said stator being such that the rotor poles face the sides of the stator poles; and additional means associated with said rotor poles for increasing the flux thereof.

21. In a single-phase motor, the combination which comprises: a stator having first and second rows of salient poles, said rows of poles being arranged about the circumference of the motor in opposite axially spaced-apart relationship; and a permanent magnet rotor mounted for rotation relative to said stator, said rotor having equally spaced poles which are narrower than the pole pitch of said rotor and at least a portion of each stator pole being wider than the pole pitch of said rotor, said rotor poles being spaced from said portions of said stator poles in radial direction, said rotor poles facing those portions of said stator poles at which said stator poles are wider than the pole pitch of said rotor.

22. The combination defined in claim 21 wherein the stator poles pertaining to said first row of one polarity and the stator poles pertaining to said second row are of the opposite polarity, said rows of stator poles being staggered with respect to each other.

References Cited in the file of this patent

UNITED STATES PATENTS

| | | |
|---|---|---|
| 2,432,573 | Jorgensen | Dec. 16, 1947 |
| 2,620,450 | Midgley | Dec. 2, 1952 |

FOREIGN PATENTS

| | | |
|---|---|---|
| 1,149,195 | France | July 8, 1957 |